US012547556B2

(12) United States Patent
Hartwig et al.

(10) Patent No.: US 12,547,556 B2
(45) Date of Patent: Feb. 10, 2026

(54) DRIVER HOT SWAP FOR SERVICING KERNEL-MODE DRIVERS

(71) Applicant: Microsoft Technology Licensing, LLC, Redmond, WA (US)

(72) Inventors: Cody Dean Hartwig, Seattle, WA (US); Drew Douglas Cross, Bothell, WA (US); Raz Meir Aloni, Seattle, WA (US); Minsang Kim, Bellevue, WA (US); Yevgeniy M Bak, Redmond, WA (US); Shen Wang, Sammamish, WA (US); Candace Williams, Stafford, WA (US); Kyle James Philistine, Seattle, WA (US); Yinghan Yang, Sammamish, WA (US); Jason Stewart Wohlgemuth, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/757,059

(22) Filed: Jun. 27, 2024

(65) Prior Publication Data

US 2026/0003802 A1  Jan. 1, 2026

(51) Int. Cl.
 *G06F 13/10* (2006.01)
(52) U.S. Cl.
 CPC ........ *G06F 13/102* (2013.01); *G06F 2213/40* (2013.01)
(58) Field of Classification Search
 None
 See application file for complete search history.

(56) References Cited

U.S. PATENT DOCUMENTS

| | | | | |
|---|---|---|---|---|
| 6,314,525 | B1 * | 11/2001 | Mahalingham | H04L 12/2898 714/4.12 |
| 6,671,751 | B1 * | 12/2003 | Chen | G06F 3/0689 710/36 |
| 7,124,228 | B2 * | 10/2006 | Grouzdev | G06F 13/102 717/124 |
| 2019/0332373 | A1 | 10/2019 | Zytaruk | |
| 2022/0261263 | A1 * | 8/2022 | Belkar | G06F 9/45533 |

OTHER PUBLICATIONS

Extended European search report received for PCT Application No. 25184210.0, mailed on Oct. 16, 2025, 9 Pages.

* cited by examiner

*Primary Examiner* — Farley Abad
*Assistant Examiner* — Dayton Lewis-Taylor
(74) *Attorney, Agent, or Firm* — Workman Nydegger

(57) ABSTRACT

A method implemented in a computer system involving a processor system includes loading a first version of a driver into memory, identifying a first endpoint set within the driver, and wrapping each endpoint in the set with a wrapper. The wrappers are registered within the operating system for calling endpoints in the first endpoint set. Subsequently, a second version of the driver is loaded into memory, and the first version is swapped with the second version. The swap process involves determining if the first version has active external calls, ceasing execution if no active calls are present, configuring the wrappers to use the second endpoint set, and initiating execution of the second version of the driver.

20 Claims, 6 Drawing Sheets

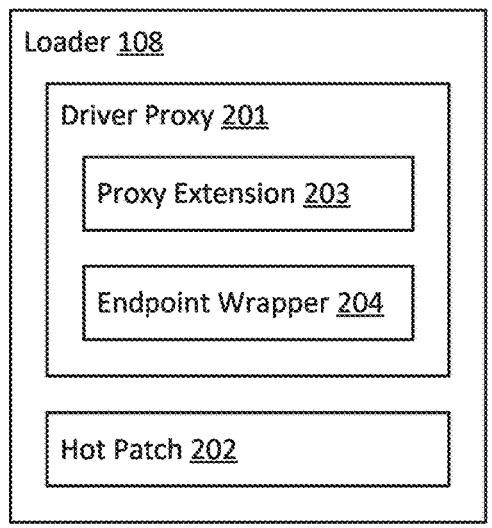
FIG. 2
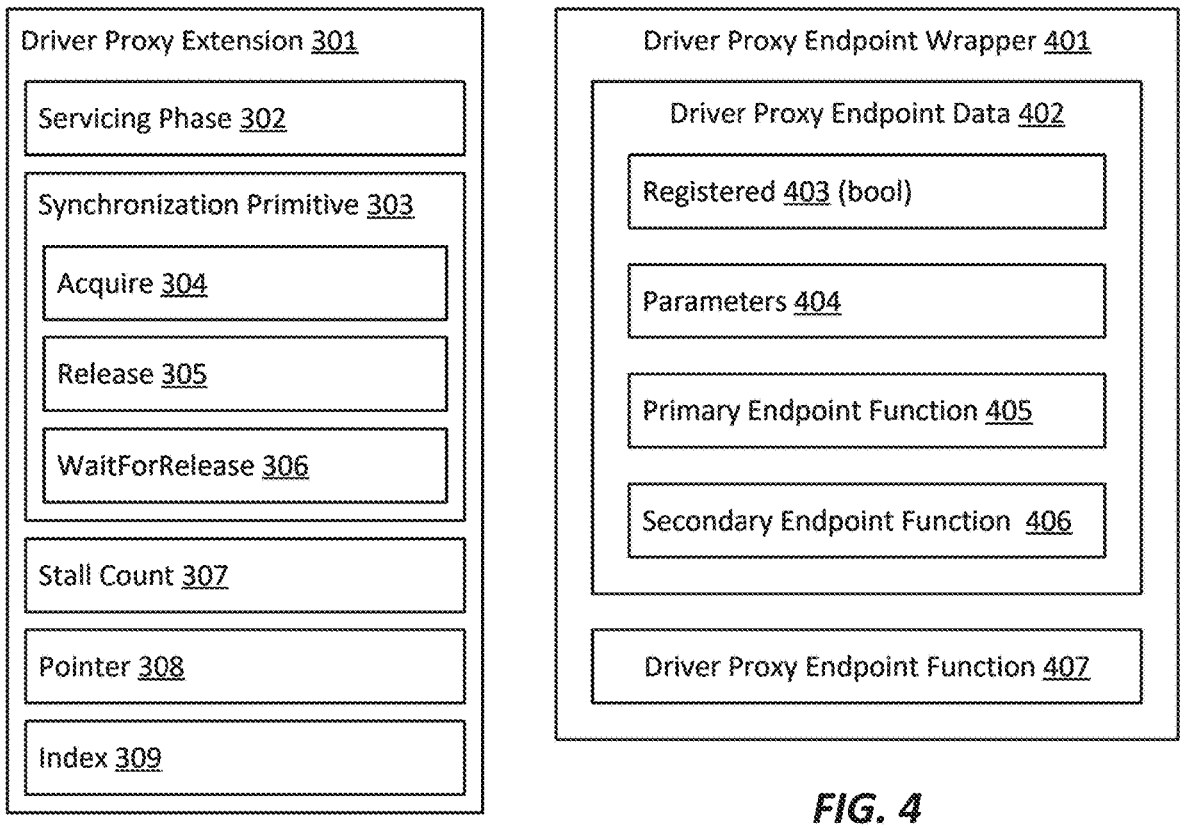
FIG. 3
FIG. 4

DRIVER HOT SWAP FOR SERVICING KERNEL-MODE DRIVERS

BACKGROUND

Kernel-mode drivers are software components that operate in the kernel space of an operating system (OS) and interact directly with the hardware and system resources. They are responsible for managing base-level functions such as device input/output, memory management, and system calls. Thus, kernel-mode drivers act as a bridge between the hardware and the software, allowing the OS to communicate with and control the hardware, and are essential for the proper functioning of the OS and the hardware devices connected to it. Updating or servicing kernel-mode drivers can be complex and disruptive, often requiring a system reboot or shutdown of associated device stacks. This can result in downtime and loss of productivity for users.

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including: loading a first version of a driver into a memory of the computer system, loading the first version of the driver including: identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an operating system (OS), a second memory address of a wrapper function for calling the first endpoint, wherein when called, the wrapper function at least, increments a call count based on making a call to the first endpoint using the first memory address, and decrements the call count based on a return from the call to the first endpoint using the first memory address; loading a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; and swapping the first version of the driver with the second version of the driver, including, determining, based on the call count being zero, that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

In some aspects, the techniques described herein relate to methods, systems, and computer program products, including: loading a first version of a driver into a memory of the computer system, loading the first version of the driver including: identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an OS, a second memory address of a wrapper function for calling the first endpoint, wherein when called, the wrapper function at least, increments a call count based on making a call to the first endpoint using the first memory address, and decrements the call count based on a return from the call to the first endpoint using the first memory address; loading a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; updating a global data access in the second version of the driver to instead refer to global data in the first version of the driver; and swapping the first version of the driver with the second version of the driver, including, determining, based on the call count being zero, that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

In some aspects, the techniques described herein relate to methods, systems, and computer program products, including: loading a first version of a driver into a memory of a computer system, loading the first version of the driver including: identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an OS, a second memory address of a wrapper function for calling the first endpoint; load a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; updating a global data access in the second version of the driver to instead refer to global data in the first version of the driver; and swapping the first version of the driver with the second version of the driver, including, determining that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which:

FIG. 2 illustrates an example of an operating system loader that facilitates driver hot-swap for servicing kernel-mode drivers;

FIG. 3 illustrates an example of a driver proxy extension;

FIG. 4 illustrates an example of a driver proxy endpoint wrapper;

DETAILED DESCRIPTION

Various attempts have been made to reduce the disruptiveness of updating or servicing kernel-mode drivers. For example, the Hotpatch technology developed by MICROSOFT CORPORATION offers a method for updating drivers without necessitating system reboots or interrupting ongoing operations. This technology leverages a patching mechanism that allows updates to be applied directly to the active code in memory, thereby ensuring that the system remains operational during the update process. Hotpatching creates a set of modified functions, or "hotpatches," which are dynamically injected into the running kernel or user-mode processes. These hotpatches update existing functions to jump to a modified version, ensuring the system continues operating with the latest driver enhancements and security fixes.

One of the significant challenges associated with Hotpatch, and similar technologies, is the complexity of juggling two executing driver instances during and after the hotpatching process. Ensuring the old and new driver instances can coexist without conflicts requires meticulous coordination and precise timing. For example, an operating system (OS) must manage the transition of active processes from the old driver to the new one seamlessly without causing disruptions or instability. This involves maintaining compatibility and synchronization between the two instances, managing shared resources, etc.

The embodiments described herein overcome these challenges with driver hot swap technology, which enables new methods of component-level servicing for kernel-mode drivers. Embodiments introduce a driver proxy component that protects a driver's endpoints by wrapping those endpoints with a synchronization mechanism that can stall, defer, or fail external calls into a driver when a driver servicing is in progress. This enables the execution of an old instance of a driver to be fully stalled and for the old instance of a driver to be swapped out for a new instance of the driver, with all stalled and future external calls to begin directed to the new instance of the driver. In embodiments, the driver proxy component operates in concert with a hot patch component that hot patches the new instance of the driver so that it accesses the internal state, such as globals, of the old instance of a driver. Together, this enables one instance of a driver to be swapped out with another instance of the driver without having to restart the OS or tear down associated device stacks and without having to deal with the complexities of juggling two concurrently executing driver instances. The embodiments can enable scenarios like adding bug fixes or new features to a driver or resolving a stuck driver's state without affecting device hardware. Driver hot swap technologies are, therefore, especially useful for drivers that form the base layers of a dependency stack, such as bus drivers that are present on many device stacks on a system.

Figure 1:
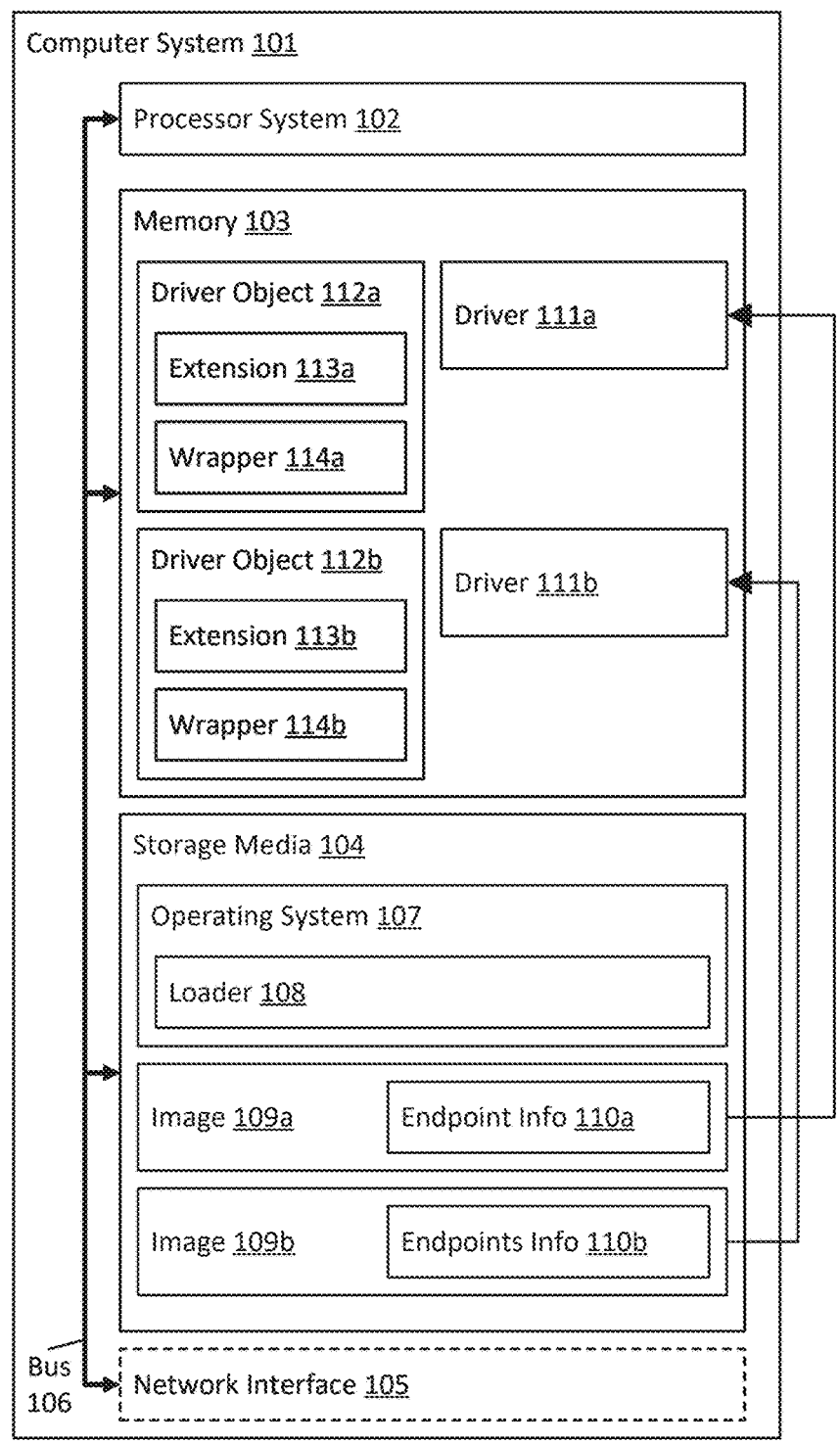
FIG. 1 illustrates an example of a computer architecture that facilitates driver hot-swap for servicing kernel-mode drivers.

FIG. 1 illustrates an example of computer architecture 100 that facilitates driver hot swap for servicing kernel-mode drivers. As shown, computer architecture 100 includes a computer system 101 comprising a processor system 102 (e.g., a single processor or a plurality of processors), a memory 103 (e.g., system or main memory), and a storage medium 104 (e.g., a single computer-readable storage medium, or a plurality of computer-readable storage media), all interconnected by a bus 106. Computer system 101 may also include other hardware interconnected by bus 106, such as a network interface 105 (e.g., one or more network interface cards) for interconnecting with other computer systems.

FIG. 1 illustrates a storage medium 104 as storing computer-executable instructions implementing at least an OS 107 and binary images 109, including binary image 109a and binary image 109b. In embodiments, binary images 109 are two different versions of a driver, e.g., binary image 109a is a first version, and binary image 109b is a second version (e.g., including bug fixes, performance improvements, new features, and the like). In computer architecture 100, a loader 108 at OS 107 loads binary image 109a, represented by driver 111a in memory 103, and driver 111a performs work on behalf of one or more consumers (e.g., software and/or hardware). Sometime later, loader 108 loads binary image 109b, represented by driver 111b in memory 103. Then, loader 108 seamlessly "hot swaps" from driver 111a to driver 111b so that all consumers of driver 111a are now consumers of driver 111b without disrupting those consumers. This hot swap, therefore, results in driver 111b taking over for driver 111a the consumers of driver 111a being unaware of the change.

In embodiments, loader 108 accomplishes these hot swaps using a combination of a driver proxy functionality that seamlessly redirects calls by consumers to driver 111a to driver 111b and hot patching functionality that seamlessly directs driver 111b to access data within driver 111a rather than driver 111b. FIG. 2 illustrates an example 200 of the loader 108 of FIG. 1. Each component of loader 108 depicted in FIG. 2 represents various functionalities that loader 108 may implement under the embodiments described herein. These components—including their identity and arrangement—are presented merely as an aid in describing example embodiments of loader 108. These components are not limited to all the functions that loader 108 may perform in various embodiments. As shown, loader 108 includes driver proxy component 201, which seamlessly redirects calls by consumers from driver 111a to driver 111b, and a hot patch component 202, which seamlessly directs driver 111b to access data within driver 111a (e.g., a ".DATA" section of binary image 109a, such as global variables) rather than within driver 111b.

In general, driver proxy component 201 operates by "wrapping" driver endpoints during the loading phase of the driver. A driver endpoint is any memory address within a driver, usually corresponding to an application programming interface (API) function, that enables a consumer to call into the driver. Examples of endpoints include input/output (I/O) request packet routines (IRPs), fast I/O routines, interrupt service routines, plug-and-play (PNP) interface functions, deferred procedure call routines (DPCs), kernel timers, power management callbacks, and work items. Wrapping a driver endpoint causes a consumer to call a memory address of a wrapper function when calling into the driver rather than calling the driver's endpoint memory address directly. When a wrapper function receives a call from a consumer, the wrapper function can perform various tasks as needed and then call a driver endpoint memory address on behalf of the consumer. When the driver returns from that call, execution resumes at the wrapper. Upon resuming execution, the wrapper returns to the original consumer. Notably, by using wrapper functions, driver proxy component 201 can facilitate a hot-swap between drivers by directing consumers' calls to endpoints in one driver (e.g., driver 111a) at one time (e.g., when driver 111a is the only driver loaded), and later direct consumers' calls to endpoints in another driver (e.g., driver 111b) at another time (e.g., after driver 111b has been loaded). Because the driver proxy component 201 replaces consumer calls directly to driver endpoints with calls to wrapper functions, consumers are not aware of the actual endpoint being called or not, and thus, driver proxy component 201 can hot-swap those endpoints without any awareness of, or interruption to, the consumer.

In example 200, driver proxy component 201 includes a proxy extension component 203 that protects driver endpoint functions and manages a driver servicing phase, including tracking state. When loading a driver, loader 108 creates a driver object in memory. This driver object represents the image of a loaded kernel-mode driver. For example, FIG. 1 illustrates memory 103 as storing a driver object 112a for driver 111a and a driver object 112b for driver 111b. The form of driver objects can vary depending on the OS. In general, however, driver objects include information such as a driver's location and size in memory, the driver's name, the entry points for various driver routines (e.g., initialization, input/output, unload), and the like. For hot-swap-enabled drivers (proxy-enabled drivers), embodiments herein extend driver objects to include a pointer to a driver proxy extension utilized by driver proxy component 201 to facilitate the wrapping of driver endpoints. In FIG. 1, these driver proxy extensions are represented as extension 113a (driver object 112a) and extension 113b (driver object 112b).

FIG. 3 illustrates one example 300 of a driver proxy extension (e.g., extension 113a, extension 113b). In particular, in FIG. 3, driver proxy extension 301 is illustrated as including servicing phase information 302, a synchronization primitive 303, a stall count 307, a pointer 308, and an index 309. In embodiments, when driver proxy component 201 is servicing a driver, proxy extension component 203 uses servicing phase information 302 to represent the current servicing step being performed between driver instances. In embodiments, when driver proxy component 201 is servicing a proxy-enabled driver, proxy extension component 203 uses synchronization primitive 303 to ensure that critical driver servicing (e.g., a hot swap) will not occur while that driver is executing (e.g., the entire driver does not have any actively executing code or synchronous code in a stack). In embodiments, synchronization primitive 303 facilitates the stalling of the driver when no endpoint functions are currently being executed so the driver can be hot-swapped to a different version. In embodiments, when driver proxy component 201 is servicing a driver, proxy extension component 203 uses the stall count 307 to track the number of times stalling of the driver has been attempted to carry out a hot-swap. In embodiments, pointer 308 is a pointer to a proxy endpoint table used for endpoint wrapping functions, while index 309 indicates which function within the generic endpoint wrapping function entries to use (e.g., a primary endpoint function or a secondary endpoint function).

In example 200, driver proxy component 201 also includes an endpoint wrapper component 204. As mentioned, driver proxy component 201 relies on wrapping endpoint functions of a driver. Endpoint wrapper component 204 manages this wrapping. In embodiments, endpoint wrapper component 204 has three primary functions. First, endpoint wrapper component 204 provides a common way of ensuring no code runs within a driver currently performing critical servicing. This is accomplished using wrapper functions around the driver's endpoints. When driver servicing is in progress, these wrapping functions prevent execution in the driver (e.g., as a result of a call from a consumer) by stalling, deferring execution, or failing the call. Second, endpoint wrapper component 204 provides a way to keep track of execution within a hot-swap supported driver and ensure critical servicing of the driver is only initiated at an appropriate time. Third, endpoint wrapper component 204 ensures endpoint function pointers given to other components are not within a driver that can be serviced. Instead, those components receive the address of a function wrapper that redirects to the endpoint function within a driver that can be serviced. Notably, this endpoint wrapping enables successive driver hot-swaps, e.g., from a first version of a driver to a second version of the driver, then from the second version to a third version, and so on.

There are a variety of approaches to wrapping a driver's endpoints that are operable with the principles described herein. However, since a driver can contain many different endpoints with different calling patterns, some embodiments provide a generic way to wrap and protect endpoint functions. This is referred to herein as generic endpoint wrapping. To protect a given endpoint function within a driver, in embodiments, a generic wrapper function accomplishes at least three tasks when that generic wrapper function is called by a consumer. First, the generic wrapper function accesses the driver proxy extension 301 for that driver, allowing the wrapper function to access and interact with the driver's synchronization primitive 303. Second, the wrapper determines which address within the driver will be invoked to call the endpoint function and the endpoint function's calling pattern (e.g., number of arguments). Third, the wrapper calls that address within the driver while passing all the arguments received from the consumer using the endpoints' calling pattern.

In some embodiments, during loading of a driver by loader 108, the driver registers a set of endpoints to be wrapped by endpoint wrapper component 204 based on calling a registration method of endpoint wrapper component 204. In other embodiments, loader 108 parses the driver's image for a special section containing endpoint information 110 (e.g., endpoint information 110a in binary image 109a, endpoint information 110b in binary image 109b) that describes the endpoints. Regardless of how the OS obtains endpoint information, in embodiments, for each endpoint, the endpoint information includes an endpoint identifier, a memory address or offset of the endpoint within the driver, and the number of parameters taken by the endpoint. Embodiments that include endpoint information 110 within a binary image may contain more detailed information about the calling convention (e.g., what registers are used for parameter passing, how much stack space is used for parameter passing, and what registers are used for return values). In some embodiments, the driver calls the registration method for each endpoint, while in other embodiments, the driver calls the registration method with an array of endpoint information data structures, one for each endpoint.

In embodiments, the endpoint wrapper component 204 creates a driver proxy endpoint wrapper data structure for each registered endpoint. FIG. 4 illustrates an example 400 of a driver proxy endpoint wrapper 401 (e.g., wrapper 114a associated with driver object 112, wrapper 114b associated with driver object 112b). As shown in embodiments, driver proxy endpoint wrapper 401 includes driver proxy endpoint data 402, such as whether or not the endpoint is registered (registered 403), the number of parameters for the endpoint (parameters 404), and one or more endpoint function addresses within the driver (e.g., a primary endpoint function 405, secondary endpoint function 406) used to call the endpoint. Additionally, in embodiments, driver proxy endpoint wrapper 401 also includes a driver proxy endpoint function 407, which is the wrapper function for the endpoint. Once registration of an endpoint is completed, a driver can acquire the associated wrapper function (driver proxy endpoint function 407) for that endpoint to use when registering any callbacks, when populating its driver object (e.g., to publicize its endpoints to consumers), when creating a PNP interface, and the like.

Figure 5:
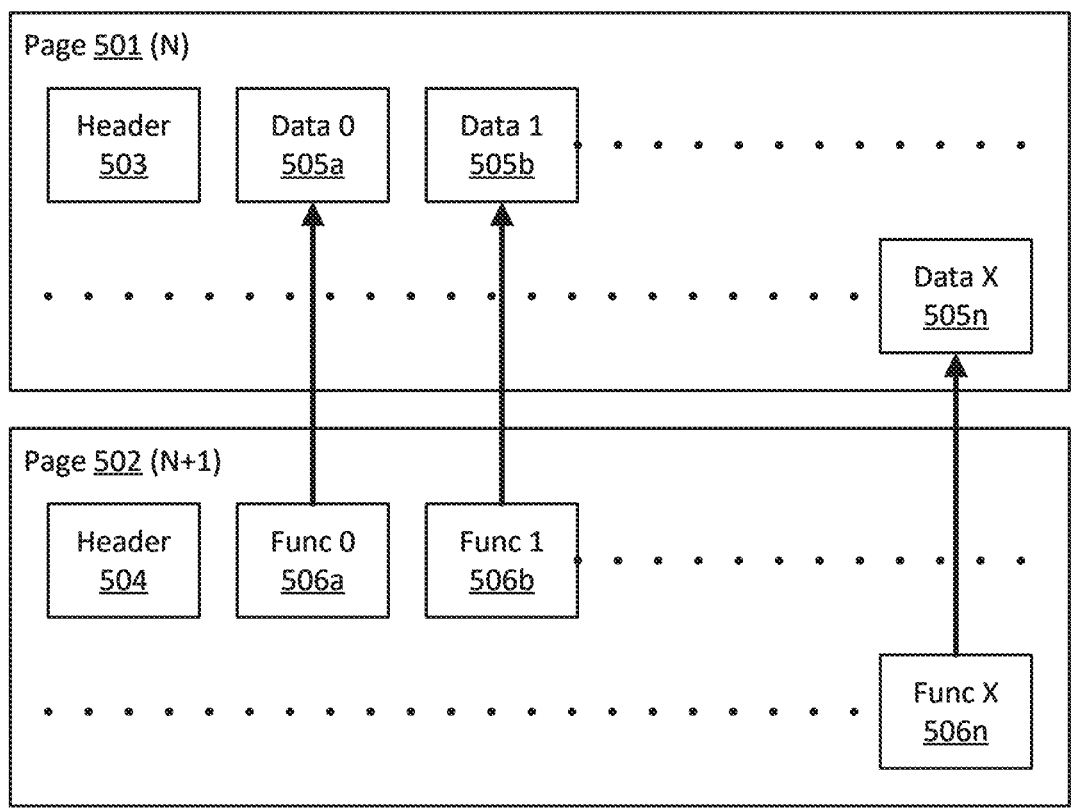
FIG. 5 illustrates an example of storing proxy endpoint data and driver proxy endpoint functions on consecutive memory pages.

In some embodiments, driver proxy endpoint data 402 and driver proxy endpoint function 407 are stored separately. In one embodiment, proxy endpoint data is stored in one page of memory marked as read-only, and the driver proxy endpoint functions are located on the next consecutive page of memory marked as execute-only. FIG. 5 illustrates an example 500 of storing proxy endpoint data and driver proxy endpoint functions (wrapper functions) on consecutive memory pages. In example 500, page 501 and page 502 are consecutive memory pages (e.g., pages N and N+1), with page 501 marked read-only and page 502 marked execute-only. As shown, driver proxy endpoint functions (e.g., functions 506a, 506b, . . . , 506n) are placed exactly one page away from their corresponding data (e.g., data 505a, 505b, . . . , 505n), a pointer to the driver's proxy extension (e.g., extension 113a and extension 113b). When executed, a driver proxy endpoint function obtains a correct proxy extension by subtracting the instruction pointer of the starting instruction of the driver proxy endpoint function. Each page may include a header, such as a header 503 on page 501 and a header 504 on page 502, containing information for proper function wrapping. In one example, one or both of these headers include the driver's driver proxy extension (e.g., extension 113a, extension 113b). Given this arrangement, for a given driver proxy endpoint function, the corresponding data is accessed by subtracting one page from the starting instruction of the driver proxy endpoint function, and the header is accessed by going to the start of the data's memory page. Combined, page 501 and page 502 form a driver proxy endpoint wrapper section. In embodiments, every allocated driver proxy endpoint wrapper section has a unique ID. In various embodiments, driver proxy endpoint wrapper sections are stored in a linked list of endpoint wrapper sections, or in contiguous memory reserved at the end of the base image (e.g., as virtual memory that is populated by physical pages only when used). In embodiments, endpoint data and function wrappers are allocated per section, and every section can hold a number, such as 64, consecutive endpoint wrapper data/function pairs.

Returning to FIG. 3, as mentioned, driver proxy component 201 uses the synchronization primitive 303 of a driver proxy extension 301 for a particular driver). In embodiments, synchronization primitive 303 can include synchronization semantics such as Using synchronization primitive 303, a driver's endpoint execution is tracked by a lock referred to herein as a "simple rundown." In embodiments, the simple rundown has one lock overall or one lock per processor. Notably, taking one lock per processor versus one lock overall may reduce cache contention. In embodiments, synchronization primitive 303 provides various functions, such as acquire 304, release 305, and wait-for-release 306. Additionally, in embodiments, synchronization primitive 303 keeps a count of endpoint enters (e.g., incrementing the count) and exits (e.g., decrementing the count), as well as a flag to indicate whether or not a stall is in progress (SIP). In embodiments, the acquire 304 function is called at the beginning of an endpoint-wrapping function before that wrapping function calls into a driver instance's real endpoint function. The acquire 304 function increments the enter/exit count and then spins, waits, or yields until the SIP flag is clear (e.g., a driver stall is not in progress). Once the acquire 304 function returns, it is safe for the endpoint wrapping function to invoke the real endpoint wrapping function.

In embodiments, the release 305 function is called near the end of an endpoint-wrapping function after completing the driver instance's real endpoint function, and only if an acquire succeeds. The release 305 function decrements the entry/exit count.

In embodiments, the wait-for-release 306 function is called by the thread (e.g., proxy extension component 203) that facilitates critical servicing. The wait-for-release 306 function attempts to set the SIP flag but only succeeds if the enter/exit count is zero. If the count is not zero, the thread will yield before trying again. Since the wait-for-release 306 function only updates the SIP flag if the enter/exit count is zero, the function can be blocked to prevent dead-locks where multiple instances of a proxy-enabled driver can appear on an execution stack. For example, if the first instance acquired the rundown, wait-for-release 306 then set the SIP flag, and the second instance then attempted to acquire the rundown, wait-for-release 306 would be stuck waiting while the second instance stalls. Some embodiments implement elevated interrupt request level (IRQL) handling with wait-for-release 306. While the thread that invokes the wait-for-release 306 function can be indefinitely blocked while waiting for the simple rundown to be free, once the SIP flag is set, this thread cannot be interrupted by a thread of a higher IRQL that invokes an endpoint. If it does, the system will be stuck in a deadlock. To handle this elevated IRQL scenario, the servicing thread gets elevated to HIGH_LEVEL, and the processor disables interrupts. This ensures there will be no stalling thread of execution above the servicing thread.

In one example on the X64 processor architecture, a wrapper function may take the following actions when called. First, the wrapper function saves integer register arguments (e.g., RCX, RDX, R8, R9) at a home position allocated by the calling component. Then, the wrapper function acquires the driver proxy extension 301 (e.g., extension 113a, extension 113b) for the driver from a data page header (e.g., header 503). Using the synchronization primitive 303 within the driver proxy extension 301, the wrapper function calls the acquire 304 function to attempt to acquire the simple rundown. If a critical servicing action is in progress, this acquire 304 function will stall until the servicing action is complete. After returning from the acquire 304 function, the wrapper function allocates stack space for the appropriate number of stack arguments for the endpoint being called (e.g., based on parameters 404) plus the home position, copies the stack arguments, and restores the integer register arguments. The wrapper function then checks the driver proxy extension 301 (e.g., index 309) to see if the primary or secondary function pointer (e.g., primary endpoint function 405 or secondary endpoint function 406) should be invoked and invokes the appropriate driver function pointer. After the endpoint returns, the wrapper function stores the volatile integer return register (e.g., RAX) and calls the release 305 function. After the release 305 function returns, the wrapper function. Restores the integer return register, restores the original stack position, and returns to the original caller.

Figure 6A:
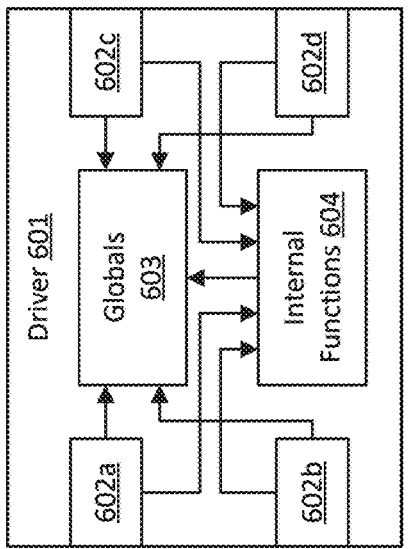
FIGS. 6A-6D illustrate an example of hot-swapping between two proxy-enabled drivers.
Figure 6B:
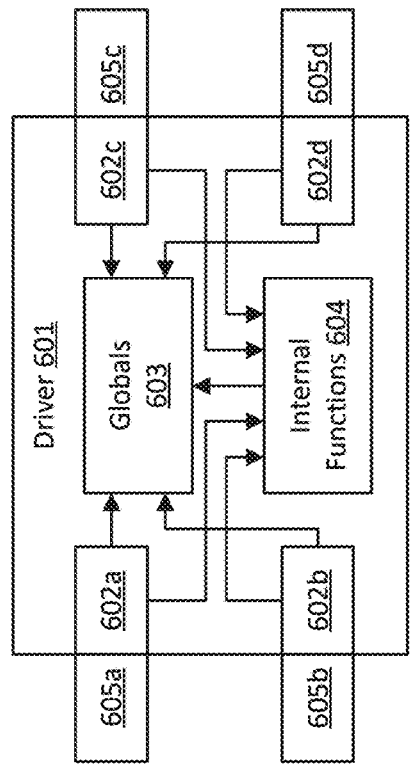

FIGS. 6A-6D illustrate an example 600 (600a-600d) of hot-swapping between two proxy-enabled drivers. In FIG. 6A, example 600a shows an example of a driver 601, such as driver 111a of FIG. 1. As shown, driver 601 has a plurality of endpoints 602 (e.g., including endpoint 602a, endpoint 602b, endpoint 602c, and endpoint 602d). Internally, driver 601 includes internal functions 604 and globals 603 that may be used by the endpoints 602 and the internal functions 604. In FIG. 6B, example 600b shows that, in connection with the loading of driver 601, driver proxy component 201 wraps endpoints 602 with wrapper functions 605 (e.g., wrapper function 605a, wrapper function 605b, wrapper function 605c, and wrapper function 605d), e.g., using the techniques described herein. As driver 601 external consumers call endpoints 602 using wrapper functions 605, wrapper functions 605 keep a count of how many external calls are in-flight (e.g., synchronization primitive 303 and the enter/exit count).

Figure 6C:
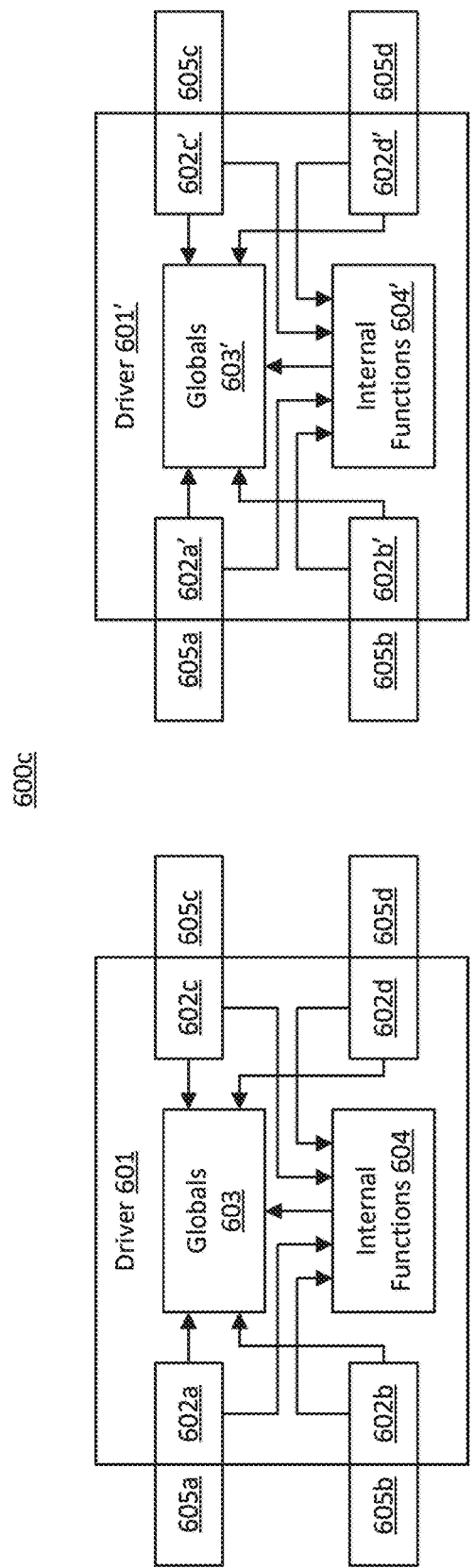
Figure 6D:
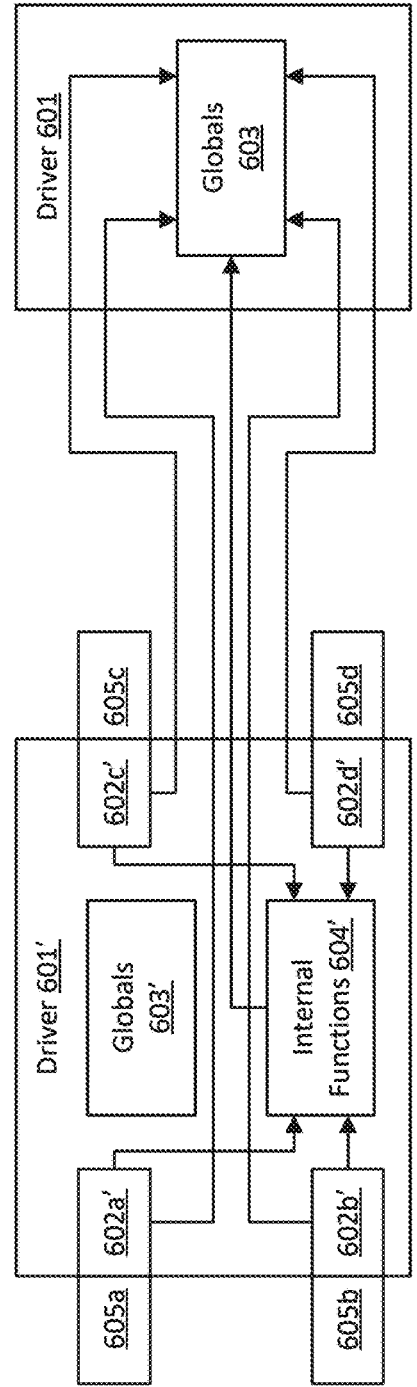

In FIG. 6C, example 600c shows that a new version of driver 601, driver 601' (e.g., driver 111b), has been loaded, and its endpoints have also been wrapped by wrapper function 605a. To facilitate a hot-swap from driver 601 to driver 601', the proxy extension component 203 leverages the wait-for-release 306 function to stall driver 601. This may take more than one attempt, but when driver 601 does stall, proxy extension component 203 coordinates with hot patch component 202 to hot swap to driver 601'. In FIG. 6D, example 600d shows that this hot swap is accomplished by proxy extension component 203 configuring wrapper functions 605 to call endpoints 602' (e.g., endpoint 602a', endpoint 602b', endpoint 602c', and endpoint 602d') within driver 601', rather than calling endpoints 602. Additionally, hot patch component 202 modifies driver 601' (including endpoints 602' and internal functions 604') to use globals 603 in driver 601 rather than globals 603' in driver 601'. After these tasks are accomplished, driver 601' can be executed to handle any future work.

Embodiments are now described in connection with FIG. 7, which illustrates a flow chart of an example method 700 for hot-swapping a proxy-enabled driver. In embodiments, instructions for implementing method 700 are encoded as computer-executable instructions (e.g., driver proxy component 201, hot patch component 202) stored on a computer storage medium (e.g., storage medium 104) that are executable by a processor (e.g., processor system 102) to cause a computer system (e.g., computer system 101) to perform method 700.

The following discussion now refers to a method and method acts. Although the method acts are discussed in specific orders or are illustrated in a flow chart as occurring in a particular order, no order is required unless expressly stated or required because an act is dependent on another act being completed prior to the act being performed.

Figure 7:
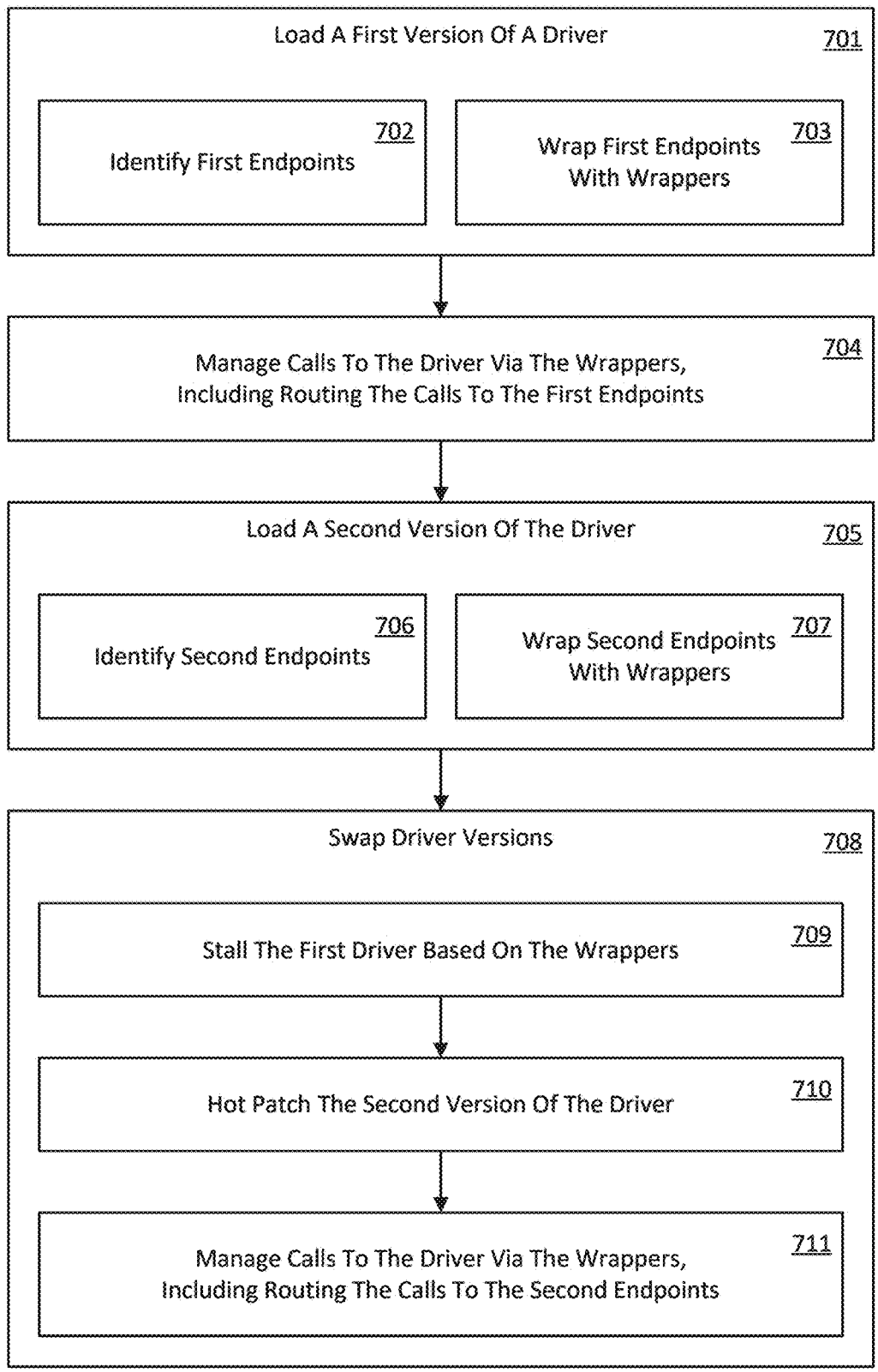
FIG. 7 illustrates a flow chart of an example of a method for hot-swapping a proxy-enabled driver.

Referring to FIG. 7, in embodiments, method 700 comprises act 701 of loading a first version of a driver. In some embodiments, act 701 comprises loading a first version of a driver into a memory of the computer system. For example, loader 108 loads binary image 109a into memory 103 as driver 111a.

Method 700 also comprises act 702 of identifying first endpoints. In some embodiments, act 702 comprises identifying a first endpoint set in the first version of the driver, the first endpoint set including a first endpoint loaded at a first memory address in the memory and enabling calls into the first version of the driver using the first memory address. For example, as part of loader 108 loading binary image 109a, endpoint wrapper component 204 identifies endpoints in driver 111a. For instance, in example 600a, driver 601 includes endpoints 602.

Method 700 also comprises act 703 of wrapping the first endpoints with wrappers. In some embodiments, act 703 comprises wrapping each endpoint in the first endpoint set with one or more wrappers, including registering, within an OS, a second memory address of a wrapper function for calling the first endpoint. For example, endpoint wrapper component 204 wraps each identified endpoint with a wrapper function so that the endpoint is callable using an address of a wrapper function rather than the endpoint's actual address. In example 600b, for instance, endpoints 602 of driver 601 are wrapped in wrapper functions 605.

While various wrapping techniques would be compatible with the principles described herein, in one example, endpoint wrapping includes forming a driver proxy extension 301 and a driver proxy endpoint wrapper 401. In the examples described herein, this includes configuring a first memory page (e.g., page 501) with data (e.g., data 505) usable by the executable code. In the examples described herein, this also includes configuring an adjacent second memory page (e.g., page 502) with executable code, including a set of function stubs (e.g., functions 506). In embodiments, each function stub (e.g., function 506a) is located at a different offset in the second memory page, corresponds to a different endpoint in the second endpoint set, and is configured to obtain a portion of data (e.g., data 505a) from a corresponding offset in the first memory page. In embodiments, the portion of data is usable to identify a synchronization primitive (e.g., synchronization primitive 303) and a set of parameters (e.g., parameters 404) needed to call the corresponding endpoint in the second endpoint set. In some embodiments, the first memory page is configured as read-only, and the second memory page is configured as execute-only (e.g., using a memory page table).

Method 700 also comprises act 704 of managing calls to the driver via the wrappers, including routing the calls to the first endpoints. In some embodiments act 704 comprises, when the wrapper is called, incrementing a call count based on making a call to the first endpoint using the first memory address and decrementing the call count based on a return from the call to the first endpoint using the first memory address. For example, when a consumer calls one of endpoints 602, that consumer calls one of the wrapper functions 605 rather than one of endpoints 602 directly. When called, a wrapper function does work to help facilitate how-swap, such as incrementing and decrementing a total call count for the driver. Other work can include passing parameters received by the wrapper to the endpoint. Thus, in some embodiments, act 704 may also include identifying by a register and a stack configuration needed to make a call to the first endpoint and configures the registers and the stack accordingly when making the call to the first endpoint. Other work can also include determining if the driver has been stalled for a hot swap. Thus, in some embodiments, act 704 may also include determining that a driver stall is in progress and waiting for the driver stall to end before making the call to the first endpoint (in which case the call would proceed to the new version of the driver).

As described, in embodiments, wrapper functions use a synchronization primitive, such as synchronization primitive 303. In embodiments, the synchronization primitive includes an acquire function (e.g., acquire 304) that increments a call count, determines if a driver stall is in progress, and then spins, waits, or yields until the driver stall is no longer in progress. In embodiments, the synchronization primitive also includes a release function (e.g., release 305) that decrements the call count. In embodiments, the synchronization primitive also includes a wait-for-release function (e.g., wait-for-release 306) that determines if the call count is zero and sets a flag indicating the driver stall is in progress when the call count is zero. In embodiments, incrementing a call count in act 704 comprises the wrapper function calling the acquire function, and decrementing the call count in act 704 comprises the wrapper function calling the release function.

Method 700 also comprises act 705 of loading a second version of the driver. In some embodiments, act 705 comprises loading a second version of the driver into the memory after loading the first version of the driver. For example, loader 108 loads binary image 109*b* into memory 103 as driver 111*b*.

Method 700 also comprises act 706 of identifying second endpoints. In some embodiments, act 706 comprises identifying a second endpoint set that includes a second endpoint corresponding to the first endpoint, the second endpoint being loaded at a third memory address in the memory, and enabling calls into the second version of the driver using the third memory address. For example, as part of loader 108 loading binary image 109*a*, endpoint wrapper component 204 identifies endpoints in driver 111*b*. For instance, in example 600*c*, driver 601' includes endpoints 602'.

Method 700 also comprises act 707 of wrapping the second endpoints with wrappers. In some embodiments, act 707 wrapping each endpoint in the second endpoint set with one or more wrappers, including registering, within the OS, a memory address of a wrapper function for calling the second endpoint. For example, endpoint wrapper component 204 wraps each identified endpoint with a wrapper function so that the endpoint is callable using an address of a wrapper function rather than the endpoint's actual address. In example 600*c*, for instance, endpoints 602' of driver 601 are wrapped in wrapper functions 605. In embodiments, the wrapper functions used to wrap the first set of endpoints are the same ones used to wrap the second set of endpoints. In other embodiments, the wrapper functions used to wrap the first set of endpoints are distinct from those used to wrap the second set of endpoints.

Method 700 also comprises act 708 of swapping driver versions. In some embodiments, act 707 comprises swapping the first version of the driver with the second version of the driver. For example, example 600*d* shows that driver 601 is swapped out for driver 601' for all future work, including any calls that are stalled in wrapper functions 605 and any future calls.

As shown, in embodiments, act 708 comprises act 709 of stalling the first driver based on the wrappers. In embodiments, act 709 comprises determining, based on the call count being zero, that the first version of the driver has no active external calls, and ceasing execution of the first version of the driver. For example, proxy extension component 203 uses the wait-for-release 306 function of synchronization primitive 303 to stall driver 111*a* when its call count reaches zero.

As shown, in embodiments, act 708 also comprises act 710 of hot patching the second version of the driver. In embodiments, act 710 comprises the method further comprising updating a global data access in the second version of the driver to instead refer to global data in the first version of the driver. For example, hot patch component 202 hot-patches driver 111*b* (driver 601') so that its endpoints 602 and internal functions 604' use globals 603 within driver 111*a* (driver 601) rather than globals 603' within driver 111*b*. Some embodiments reroute all accesses to global data to the first version of the driver. In some embodiments, this is accomplished by using indirect pointers for global accesses and updating these pointers during driver load time.

As shown, in embodiments, act 708 also comprises act 711 of managing calls to the driver via the wrappers, including routing the calls to the second endpoints. In embodiments, act 711 comprises configuring the one or more wrappers to use the second endpoint set rather than the first endpoint set, including configuring the wrapper function to call the third memory address rather than the first memory address and initiating execution of the second version of the driver. For example, proxy extension component 203 resumes execution of driver 111*b*, at which time, the wrapper functions 605 begin directing calls to driver 111*b* (endpoints 602') rather than driver 111*a* (endpoints 602).

Alternatively or in addition to the other examples described herein, examples include any combination of the following:

Clause 1. A method, implemented in a computer system that includes a processor system, the method comprising: loading a first version of a driver into a memory of the computer system, loading the first version of the driver including: identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an OS, a second memory address of a wrapper function for calling the first endpoint, wherein when called, the wrapper function at least, increments a call count based on making a call to the first endpoint using the first memory address, and decrements the call count based on a return from the call to the first endpoint using the first memory address; loading a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; and swapping the first version of the driver with the second version of the driver, including, determining, based on the call count being zero, that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

Clause 2. The method of clause 1, wherein, the first version of the driver includes global data, and the method further comprises updating a global data access in the second version of the driver to instead refer to the global data in the first version of the driver.

Clause 3. The method of clause 1, wherein, the first endpoint set comprises a first plurality of endpoints, each enabling calls into the first version of the driver using a corresponding memory address; and the second endpoint set comprises a second plurality of endpoints, the second endpoint set including an endpoint corresponding to each endpoint in the first endpoint set that enables calls into the second version of the driver using a corresponding memory address.

Clause 4. The method of clause 1, wherein, when called, the wrapper function also: identifies a register and a stack configuration needed to make a call to the first endpoint; and configures the registers and the stack when making the call to the first endpoint.

Clause 5. The method of clause 1, wherein, when called, the wrapper function also:
determines that a driver stall is in progress; and waits for the driver stall to end before making the call to the first endpoint.

Clause 6. The method of clause 1, wherein wrapping each endpoint in the first endpoint set with the one or more wrappers includes: configuring a first memory page with data usable by executable code; and a second memory page adjacent to the first memory page, the second memory page comprising the executable code, including a set of function stubs, each function stub located at a different offset in the second memory page and corresponding to a different endpoint in the second endpoint set, wherein: each function stub in the set of function stubs is configured to obtain a portion of data from a corresponding offset in the first memory page, the portion of data usable to identify a synchronization primitive and a set of parameters needed to call the corresponding endpoint in the second endpoint set.

Clause 7. The method of clause 6, wherein the first memory page is configured as read-only, and the second memory page is configured as execute-only.

Clause 8. The method of clause 1, wherein the wrapper function utilizes a synchronization primitive that includes: an acquire function that: increments a call count; determines if a driver stall is in progress; and spins, waits, or yields until the driver stall is no longer in progress; a release function that decrements the call count; and a wait-for-release function that: determines if the call count is zero; and sets a flag indicating the driver stall is in progress when the call count is zero.

Clause 9. The method of clause 8, wherein, the wrapper function incrementing the call count comprises the wrapper function calling the acquire function; and the wrapper function decrementing the call count comprises the wrapper function calling the release function.

Clause 10. A computer system, comprising: a processor system; and a computer storage medium that stores computer-executable instructions that are executable by the processor system to at least: load a first version of a driver into a memory of the computer system, loading the first version of the driver including: identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an OS, a second memory address of a wrapper function for calling the first endpoint, wherein when called, the wrapper function at least, increments a call count based on making a call to the first endpoint using the first memory address, and decrements the call count based on a return from the call to the first endpoint using the first memory address; load a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; update a global data access in the second version of the driver to instead refer to global data in the first version of the driver; and swap the first version of the driver with the second version of the driver, including, determining, based on the call count being zero, that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

Clause 11. The computer system of clause 10, wherein, the first endpoint set comprises a first plurality of endpoints, each enabling calls into the first version of the driver using a corresponding memory address; and the second endpoint set comprises a second plurality of endpoints, the second endpoint set including an endpoint corresponding to each endpoint in the first endpoint set that enables calls into the second version of the driver using a corresponding memory address.

Clause 12. The computer system of clause 10, wherein, when called, the wrapper function also: identifies a register and a stack configuration needed to make a call to the first endpoint; and configures the registers and the stack when making the call to the first endpoint.

Clause 13. The computer system of clause 10, wherein, when called, the wrapper function also: determines that a driver stall is in progress; and waits for the driver stall to end before making the call to the first endpoint.

Clause 14. The computer system of clause 10, wherein wrapping each endpoint in the first endpoint set with the one or more wrappers includes: configuring a first memory page with data usable by executable code; and a second memory page adjacent to the first memory page, the second memory page comprising the executable code, including a set of function stubs, each function stub located at a different offset in the second memory page and corresponding to a different endpoint in the second endpoint set, wherein: each function stub in the set of function stubs is configured to obtain a portion of data from a corresponding offset in the first memory page, the portion of data usable to identify a synchronization primitive and a set of parameters needed to call the corresponding endpoint in the second endpoint set.

Clause 15. The computer system of clause 14, wherein the first memory page is configured as read-only, and the second memory page is configured as execute-only.

Clause 16. The computer system of clause 10, wherein the wrapper function utilizes a synchronization primitive that includes: an acquire function that: increments a call count; determines if a driver stall is in progress; and spins, waits, or yields until the driver stall is no longer in progress; a release function that decrements the call count; and a wait-for-release function that: determines if the call count is zero; and sets a flag indicating the driver stall is in progress when the call count is zero.

Clause 17. The computer system of clause 16, wherein, the wrapper function incrementing the call count comprises the wrapper function calling the acquire function; and the wrapper function decrementing the call count comprises the wrapper function calling the release function.

Clause 18. A computer storage medium that stores computer-executable instructions that are executable by a processor system to at least: load a first version of a driver into a memory of a computer system, loading the first version of the driver including: identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an OS, a second memory address of a wrapper function for calling the first endpoint; load a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; update a global data access in the second version of the driver to instead refer to global data in the first version of the driver; and swap the first version of the driver with the second version of the driver, including, determining that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

Clause 19. The computer storage medium of clause 18, wherein, when called, the wrapper function at least: increments a call count used to determine that the first version of the driver has no active external calls; identifies a set of one or more parameters used by the first endpoint; makes a call to the first endpoint using the first memory address while passing the set of one or more parameters to the first endpoint; and decrements the call count based on a return from the call to the first endpoint using the first memory address.

Clause 20. The computer storage medium of clause 19, wherein, when called, the wrapper function also: determines that a driver stall is in progress; and waits for the driver stall to end before making the call to the first endpoint.

Embodiments of the disclosure comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105) and eventually transferred to computer system RAM and/or less volatile computer storage media at a computer system. Thus, computer storage media can be included in computer system components that also utilize transmission media.

Computer-executable instructions comprise, for example, instructions and data which when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. In embodiments, a processor system comprises one or more central processing units (CPUs), one or more graphics processing units (GPUs), one or more neural processing units (NPUs), and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (Saas), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more virtual machines (VMs). During operation, VMs emulate an operational computing system, supporting an operating system (OS) and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only illustrative and not restrictive. All changes that come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A method, implemented in a computer system that includes a processor system, the method comprising:

loading a first version of a driver into a memory of the computer system, loading the first version of the driver including:

identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an operating system (OS), a second memory address of a wrapper function for calling the first endpoint, wherein when called, the wrapper function at least, increments a call count based on making a call to the first endpoint using the first memory address, and decrements the call count based on a return from the call to the first endpoint using the first memory address;

loading a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address; and swapping the first version of the driver with the second version of the driver, including, determining, based on the call count being zero, that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

2. The method of claim 1, wherein, the first version of the driver includes global data, and the method further comprises updating a global data access in the second version of the driver to instead refer to the global data in the first version of the driver.

3. The method of claim 1, wherein, the first endpoint set comprises a first plurality of endpoints, each enabling calls into the first version of the driver using a corresponding memory address; and the second endpoint set comprises a second plurality of endpoints, the second endpoint set including an endpoint corresponding to each endpoint in the first endpoint set that enables calls into the second version of the driver using a corresponding memory address.

4. The method of claim 1, wherein, when called, the wrapper function also:

identifies a register and a stack configuration needed to make a call to the first endpoint; and configures the registers and the stack when making the call to the first endpoint.

5. The method of claim 1, wherein, when called, the wrapper function also:

determines that a driver stall is in progress; and waits for the driver stall to end before making the call to the first endpoint.

6. The method of claim 1, wherein wrapping each endpoint in the first endpoint set with the one or more wrappers includes:

configuring a first memory page with data usable by executable code; and a second memory page adjacent to the first memory page, the second memory page comprising the executable code, including a set of function stubs, each function stub located at a different offset in the second memory page and corresponding to a different endpoint in the second endpoint set, wherein:

each function stub in the set of function stubs is configured to obtain a portion of data from a corresponding offset in the first memory page, the portion of data usable to identify a synchronization primitive and a set of parameters needed to call the corresponding endpoint in the second endpoint set.

7. The method of claim 6, wherein the first memory page is configured as read only, and the second memory page is configured as execute-only.

8. The method of claim 1, wherein the wrapper function utilizes a synchronization primitive that includes:

an acquire function that:

increments a call count;

determines if a driver stall is in progress; and spins, waits, or yields until the driver stall is no longer in progress;

a release function that decrements the call count; and a wait-for-release function that:

determines if the call count is zero; and sets a flag indicating the driver stall is in progress when the call count is zero.

9. The method of claim 8, wherein, the wrapper function incrementing the call count comprises the wrapper function calling the acquire function; and the wrapper function decrementing the call count comprises the wrapper function calling the release function.

10. A computer system, comprising:

a processor system; and a computer-readable hardware storage medium that stores computer-executable instructions that are executable by the processor system to at least:

load a first version of a driver into a memory of the computer system, loading the first version of the driver including:

identifying a first endpoint set in the first version of the driver, the first endpoint set including a first endpoint loaded at a first memory address in the memory and enabling calls into the first version of the driver using the first memory address; and wrapping each endpoint in the first endpoint set with one or more wrappers, including registering, within an operating system (OS), a second memory address of a wrapper function for calling the first endpoint, wherein when called, the wrapper function at least, increments a call count based on making a call to the first endpoint using the first memory address, and decrements the call count based on a return from the call to the first endpoint using the first memory address;

load a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address;

update a global data access in the second version of the driver to instead refer to global data in the first version of the driver; and swap the first version of the driver with the second version of the driver, including, determining, based on the call count being zero, that the first version of the driver has no active external calls, ceasing execution of the first version of the driver after determining that the first version of the driver has no active external calls, configuring the one or more wrappers to use the second endpoint set rather than the first endpoint set, including configuring the wrapper function to call the third memory address rather than the first memory address, and initiating execution of the second version of the driver.

11. The computer system of claim 10, wherein, the first endpoint set comprises a first plurality of endpoints, each enabling calls into the first version of the driver using a corresponding memory address; and the second endpoint set comprises a second plurality of endpoints, the second endpoint set including an endpoint corresponding to each endpoint in the first endpoint set that enables calls into the second version of the driver using a corresponding memory address.

12. The computer system of claim 10, wherein, when called, the wrapper function also:

identifies a register and a stack configuration needed to make a call to the first endpoint; and configures the registers and the stack when making the call to the first endpoint.

13. The computer system of claim 10, wherein, when called, the wrapper function also:
determines that a driver stall is in progress; and
waits for the driver stall to end before making the call to the first endpoint.

14. The computer system of claim 10, wherein wrapping each endpoint in the first endpoint set with the one or more wrappers includes:
configuring a first memory page with data usable by executable code; and
a second memory page adjacent to the first memory page, the second memory page comprising the executable code, including a set of function stubs, each function stub located at a different offset in the second memory page and corresponding to a different endpoint in the second endpoint set, wherein:
each function stub in the set of function stubs is configured to obtain a portion of data from a corresponding offset in the first memory page, the portion of data usable to identify a synchronization primitive and a set of parameters needed to call the corresponding endpoint in the second endpoint set.

15. The computer system of claim 14, wherein the first memory page is configured as read-only, and the second memory page is configured as execute-only.

16. The computer system of claim 10, wherein the wrapper function utilizes a synchronization primitive that includes:
an acquire function that:
increments a call count;
determines if a driver stall is in progress; and
spins, waits, or yields until the driver stall is no longer in progress;
a release function that decrements the call count; and
a wait-for-release function that:
determines if the call count is zero; and
sets a flag indicating the driver stall is in progress when the call count is zero.

17. The computer system of claim 16, wherein,
the wrapper function incrementing the call count comprises the wrapper function calling the acquire function; and
the wrapper function decrementing the call count comprises the wrapper function calling the release function.

18. A computer-readable hardware storage medium that stores computer-executable instructions that are executable by a processor system to at least:
load a first version of a driver into a memory of a computer system, loading the first version of the driver including:
identifying a first endpoint set in the first version of the driver, the first endpoint set including a first endpoint loaded at a first memory address in the memory and enabling calls into the first version of the driver using the first memory address; and
wrapping each endpoint in the first endpoint set with one or more wrappers, including registering, within an operating system (OS), a second memory address of a wrapper function for calling the first endpoint;
load a second version of the driver into the memory after loading the first version of the driver, the second version of the driver including a second endpoint set that includes a second endpoint corresponding to the first endpoint, the second endpoint being loaded at a third memory address in the memory and enabling calls into the second version of the driver using the third memory address;
update a global data access in the second version of the driver to instead refer to global data in the first version of the driver; and
swap the first version of the driver with the second version of the driver, including,
determining that the first version of the driver has no active external calls,
ceasing execution of the first version of the driver after determining that the first version of the driver has no active external calls,
configuring the one or more wrappers to use the second endpoint set rather than the first endpoint set, including configuring the wrapper function to call the third memory address rather than the first memory address, and
initiating execution of the second version of the driver.

19. The computer-readable hardware storage medium of claim 18, wherein, when called, the wrapper function at least:
increments a call count used to determine that the first version of the driver has no active external calls;
identifies a set of one or more parameters used by the first endpoint;
makes a call to the first endpoint using the first memory address while passing the set of one or more parameters to the first endpoint; and
decrements the call count based on a return from the call to the first endpoint using the first memory address.

20. The computer-readable hardware storage medium of claim 19, wherein, when called, the wrapper function also:
determines that a driver stall is in progress; and
waits for the driver stall to end before making the call to the first endpoint.

* * * * *